Figure 1:
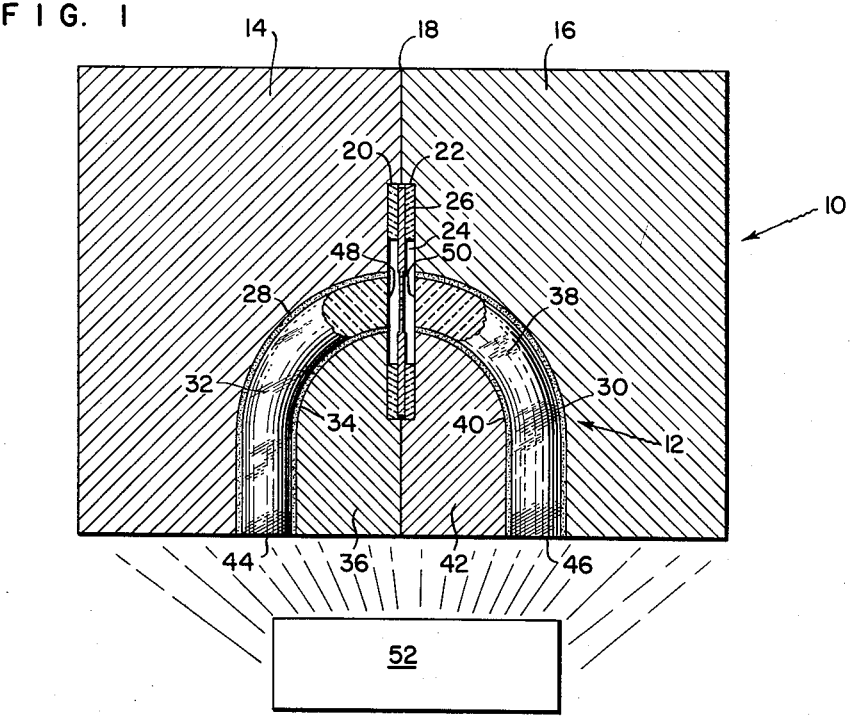

Dec. 22, 1964  A. G. KUDELKO  3,162,045
RADIATION PYROMETER
Filed March 31, 1960

INVENTOR.
ARTHUR G. KUDELKO
BY
ATTORNEY.

United States Patent Office 3,162,045
Patented Dec. 22, 1964

3,162,045
RADIATION PYROMETER
Arthur G. Kudelko, Glenside, Pa., assignor to Honeywell Inc., a corporation of Delaware
Filed Mar. 31, 1960, Ser. No. 19,031
7 Claims. (Cl. 73—355)

The present invention relates to radiation pyrometers and particularly to a radiation pyrometer having increased sensitivity.

It has been known heretofore that the sensitivity of radiation pyrometers can be increased if the radiation being measured is directed at both sides of the detector of the radiation pyrometer. In order to take advantage of this principle of increased sensitivity, radiation pyrometers have been provided with reflecting means directed at the rear surface thereof to reflect back at the rear surface radiation emitted from the source. This has not been entirely satisfactory due to the fact that the detector tends to reduce the amount of radiation impinging upon the mirror and, furthermore, if high temperatures are encountered the reflecting means tends to discolor and become much less effective.

Accordingly, the main object of the present invention is the provision of a new and improved radiation pyrometer of increased sensitivity.

Another object of the present invention is the provision of a new and improved radiation pyrometer having novel means for directing radiation from the source to both the front and back of the detector.

A further object of the present invention is the provision of a new and improved radiation pyrometer having radiant energy guides which direct energy at both the front and back of the detector of the radiation pyrometer in order to increase its sensitivity.

The above and other objects, characteristics and features of construction of the present invention will be more fully understood from the following description taken in connection with the accompanying illustrative drawing.

Figure 2:
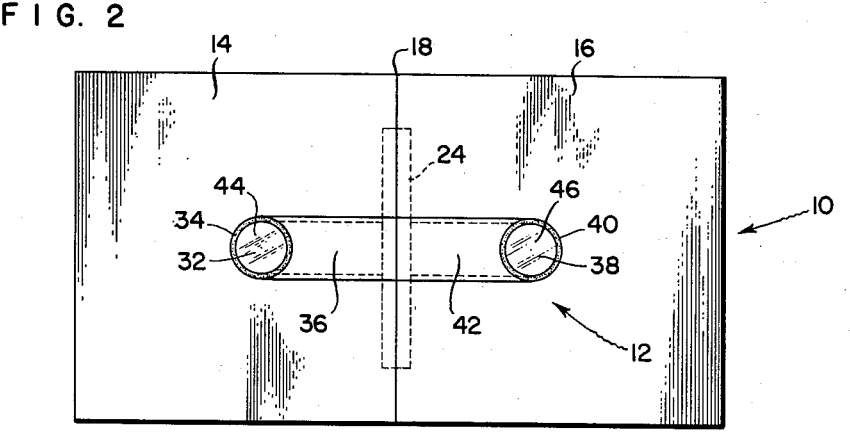

In the drawing:

FIG. 1 is a diagrammatic sectional view of a radiation pyrometer embodying the present invention; and FIG. 2 is an end view of the radiation pyrometer shown in FIG. 1.

Referring now to the drawing in detail, the radiation pyrometer 10 comprises a body 12 which, as shown herein, is made of two body portions 14 and 16 which are cemented together along the seam 18 in any suitable manner. Body 12 is made of any suitable material. The suitability of the material is dependent upon the contemplated use for the radiation pyrometer. In the event that the pyrometer is to be used in a high temperature application then, of course, a highly refractory material, such as ceramic would be indicated. For lower temperature uses many other materials may be employed.

Each of the body portions 14 and 16 is provided with a recessed portion 20 and 22, respectively, which together define a chamber 24 for reception of a convention pyrometer detection device 26. Such a detection device is shown in U.S. Patent 2,357,193; patented August 29, 1944; to T. R. Harrison and may be used to actuate a self-balancing potentiometer such as is shown in U.S. Patent 2,423,540; patented July 8, 1947; to W. R. Willis. Each of the body portions 14 and 16 is further provided with an arcuate cavity 28 and 30, respectively, which cavities are filled in a manner to be made clear hereinafter. Both cavities, however, are in communication with chamber 24. Disposed in cavity 28 and bearing against the peripheral surface thereof is an arcuate radiant energy transmitting member 32 having a relatively high index of refraction. I have found that a sapphire rod is emi- nently suited for this purpose although quartz or "Lucite" is satisfactory provided temperature requirements can be met. The sapphire rod 32 is coated with a material having a low index of refraction. Any of a number of glasses or organic materials will satisfactorily serve as the coating 34 of sapphire rod 32. The sapphire rod 32 with its coating 34 is fixedly held in surface-to-surface relation with the arcuate portion of the peripheral wall of cavity 28 in any suitable manner such as by cement. Moreover, an arcuate-shaped piece 36 is disposed in the portion of cavity 28 which has not been filled by rod 32 and coating 34. A similar arrangement is provided for the other body portion 16. That is, a similarly shaped sapphire rod 38 having a coating 40 of low index of refraction is disposed in cavity 30 of body portion 16 and is fixedly held therein in any suitable manner such as by cement. Moreover, a member 42 is disposed in the portion of cavity 30 not filled by coated rod 38. It is to be noted that members 36 and 42 not only partially define arcuate passages for rods 32 and 38, respectively, but also partially define chamber 24 for detector 26. Each of the sapphire rods 32 and 38 has one end in communication with cavity 24. However, the ends in communication with cavity 24 come into communication with said cavity along opposed surfaces. Accordingly, the coated sapphire rods 32 and 38 are directed at opposite ends or surfaces of detector 26.

It is well known that when radiation enters a light transmitting member of high index of refraction, it will remain within said member provided it does not strike a surface of that member at an angle less than the critical angle of total reflection. However, the critical angle of total reflection is dependent upon the relative indexes of refraction of the radiant energy conducting member and the medium surrounding said member. If the radiant energy conducting member has an index of refraction that is not materially greater than the index of refraction of the surrounding medium, then the critical angle of total reflection would be relatively large and a substantial portion of the radiant energy entering one end of the radiant energy transmitting means would not reach the opposite end thereof since it would have passed out of the rod during its passage through the rod. However, if the index of refraction of the radiant energy transmitting member is high when compared with the surrounding medium, then the critical angle of total reflection will be very small. Accordingly, since sapphire has a high index of refraction, substantially all of the radiant energy entering the open ends 44 and 46 of sapphire rods 32 and 38, respectively, will pass out of the closed ends 48 and 50 of said rods, respectively, whereby to direct radiant energy being emitted from any hot body 52 at opposite sides of the pyrometer detector 26. As has been stated hereinbefore, the sensitivity of the detector is greatly increased if radiant energy is directed at both sides of the detector. Accordingly, with the arrangement described such increase in sensitivity will naturally result.

An additional advantage to the present radiation pyrometer over those known in the prior art results from the fact that extremely high temperature materials may be employed whereby to yield a radiation pyrometer of extreme sensitivity which is able to detect radiant energy at high temperatures. The body 12 may be chosen from any one of a number of high temperature ceramics. The sapphire rod 32 is able to withstand extremely high temperatures. The coatings 34 and 40 may also be chosen from one of a number of high temperature and low index of refraction materials. The opportunities for providing a radiation pyrometer using a mirror to increase sensitivity and which is able to withstand extremely high temperatures are greatly restricted as compared to those present in the invention described herein.

The device shown may be simplified by the omission of one of the sapphire rods. In such a modification, the front face of the pyrometric detecting device 26 would be exposed to and receive radiation directly from the source. A rod would be approximately semi-circular in shape with one end face exposed to the source of radiant energy and the other confronting the back face of the detecting device.

What is claimed is:

1. A radiation pyrometer, including, a detection device having two spaced oppositely directed surfaces, a first radiant energy transmitting member having one end thereof directed toward the outside of said pyrometer and the other end directed at one of said surfaces of the detection device, and a second radiant energy transmitting member having one end thereof directed toward the outside of said pyrometer in substantially the same direction as said outwardly directed end of said first member and the other end directed at the other of said surfaces of the detection device, whereby to direct radiant energy to both surfaces of said detection device.

2. A radiation pyrometer, including a detection device having two spaced oppositely directed surfaces, a first highly refractive transparent member having one end thereof directed toward the outside of said pyrometer and the other end directed at one of said surfaces of the detection device, and a second highly refractive transparent member having one end thereof directed toward the outside of said pyrometer in substantially the same direction as said outwardly directed end of said first member and the other end directed at the other of said surfaces of the detection device, whereby to direct radiant energy to both surfaces of said detection device.

3. A radiation pyrometer, including, a detection device having two spaced oppositely directed surfaces, a first sapphire rod having one end thereof directed toward the outside of said pyrometer and the other end directed at one of said surfaces of the detection device, and a second sapphire rod having one end thereof directed toward the outside of said pyrometer in substantially the same direction as said outwardly directed end of said first rod and the other end directed at the other of said surfaces of the detection device, whereby to direct radiant energy to both surfaces of said detection device.

4. A radiation pyrometer, including, a detection device having two spaced oppositely directed surfaces, a first highly refractive transparent member having one end thereof directed toward the outside of said pyrometer and the other end directed at one of said surfaces of the detection device, and a second highly refractive transparent member having one end thereof directed toward the outside of said pyrometer in substantially the same direction as said outwardly directed end of said first member and the other end directed at the other of said surfaces of the detection device, each of said highly refractive transparent members being coated with material of relatively low index of refraction whereby to insure that radiant energy entering said one ends of said members will leave said members through said other ends thereof to thereby direct radiant energy to both surfaces of said detection device.

5. A radiation pyrometer, including, a detection device having two spaced oppositely directed surfaces, a first sapphire rod having a first end directed outside of said pyrometer, a second end facing one of said surfaces of said detection device and a peripheral side wall connecting said two end surfaces, the peripheral side wall of said first sapphire rod being coated with a material having a relatively low index of refraction whereby to provide a low critical angle of total reflection within said rod to substantially prevent radiant energy entering said one end surface of said first rod from leaving said rod through said peripheral side wall, a second sapphire rod having a first end surface facing outwardly from said pyrometer in substantially the same direction as said first end of said first rod, a second end facing the other of said surfaces of said detection device and a peripheral side wall connecting said two end surfaces, the peripheral side wall of said second sapphire rod being coated with a material having a relatively low index of refraction whereby to provide a low critical angle of total reflection within said rod to substantially prevent radiant energy entering said one end surface of said second rod from leaving said rod through said peripheral side wall, whereby to direct radiant energy to both surfaces of said detection device.

6. A radiation pyrometer, including, a detection device having two spaced oppositely directed surfaces, a first sapphire rod having a first end directed outside of said pyrometer, a second end facing one of said surfaces of said detection device and a peripheral side wall connecting said two end surfaces, the peripheral side wall of said first sapphire rod being coated with a material having a relatively low index of refraction whereby to provide a low critical angle of total reflection within said rod to substantially prevent radiant energy entering said one end surface of said first rod from leaving said rod through said peripheral side wall, a second sapphire rod having a first end surface facing outwardly from said pyrometer in substantially the same direction as said first end of said first rod, a second end facing the other of said surfaces of said detection device and a peripheral side wall connecting said two end surfaces, the peripheral side wall of said second sapphire rod being coated with a material having a relatively low index of refraction whereby to provide a low critical angle of total reflection within said rod to substantially prevent radiant energy entering said one end surface of said second rod from leaving said rod through said peripheral side wall, the longitudinal axis of each of said rods being arcuate, whereby to direct radiant energy to both surfaces of said detection device.

7. A radiation pyrometer including, a main body portion having a front surface adapted to be directed at a radiant energy emitting body, said main body portion being provided with a hollow chamber therewithin, a detection device disposed within said chamber, said detection device having a pair of substantially parallel spaced oppositely directed surfaces extending substantially perpendicular to said front surface of said main body portion, said main body portion being further provided with a first passageway extending in an arcuate path from said front surface into said chamber and a second passageway extending in an opposed arcuate path to that of said first passageway from said front surface of said main body portion to said chamber, a first curved sapphire rod having two end surfaces and a peripheral side wall, said first sapphire rod having its peripheral side wall coated with a material of low index of refraction to provide a low critical angle of total reflection within said rod to substantially prevent radiant energy entering said one end surface of said first rod from leaving said rod through said peripheral side wall, said first sapphire rod being disposed within said first arcuate passageway with one end of said first rod facing outwardly from said front surface of said main body portion and having its other end facing one surface of said detection device, a second curved sapphire rod having two end surfaces and a peripheral side wall, said second sapphire rod having its peripheral side wall coated with a material of low index of refraction to provide a low critical angle of total reflection within said second rod to substantially prevent radiant energy entering said one end surface of said second rod from leaving said rod through said peripheral side wall thereof, said second sapphire rod being disposed within said second arcuate passageway with one end of said second rod facing outwardly from said front surface of said main body portion and having its other end facing the other surface of said detection device, whereby when said front surface is directed at said radiant energy emitting body, radiant energy is passed to both surfaces of said detection device by said two sapphire rods.

References Cited in the file of this patent

UNITED STATES PATENTS

| | | |
|---|---|---|
| 2,113,450 | Lasky et al. | Apr. 5, 1938 |
| 2,360,663 | Eddy | Oct. 17, 1944 |
| 2,503,062 | Moriorty | Apr. 4, 1950 |
| 2,709,367 | Bohnet | May 31, 1955 |
| 2,759,602 | Baigent | Aug. 21, 1956 |
| 2,825,260 | O'Brien | Mar. 4, 1958 |

FOREIGN PATENTS

| | | |
|---|---|---|
| 946,464 | Germany | July 12, 1956 |